Patented May 19, 1925.

1,538,785

UNITED STATES PATENT OFFICE.

HENRY B. FABER, OF BROOKLYN, NEW YORK, ASSIGNOR TO J. BEN DECKER, OF ELKTON, MARYLAND.

PYROTECHNIC ARTICLE.

No Drawing. Application filed June 18, 1924. Serial No. 720,827.

*To all whom it may concern:*

Be it known that I, HENRY B. FABER, a citizen of the United States, and a resident of Brooklyn, in the county of Kings and State of New York, have invented certain new and useful Improvements in Pyrotechnic Articles, of which the following is a specification.

One of the articles manufactured for Fourth of July display resembles in its form an ordinary cream peppermint drop. It is used by the children to cause a series of minor explosions. It has a trade name "spit devil." This article is placed on the sidewalk and the child stamps on it, and immediately there is a series of small explosions, which continue in a crackling fashion until the article is completely consumed. This is a very popular article and one much sought after in the trade, but one in which there lurks a danger hazard, by reason of the fact that one of its chief components is elementary or yellow phosphorus.

My invention therefore is to render this or similar articles obnoxious to the appetite of a child by coating, coloring or applying thereto an obnoxious material.

This pyrotechnic article is composed of gum arabic and water, into which is stirred yellow phosphorus, chlorate of potash, and a filler, such as clay. The contact between yellow phosphorus and chlorate of potash results in a violent explosion; that is, the mere contact—a blow or abrasion or pressure is not necessary. The only reason that these articles do not explode unless stamped on is due to the fact that the phosphorus and chlorate of potash are protected one from the other by an envelope or coating of the gum arabic solution. When these articles are dried a thin skin of gum arabic forms around the particles and they remain inert until that protecting skin is broken.

There have been many complaints that these articles are dangerous for children to use, due to the fact that they resemble in appearance a candy, and furthermore, the gum arabic does not have an unpleasing taste, and children have been known to put these articles in their mouths. In fact, more than one case has been known where serious results have been brought about by sucking these "spit devils."

It became necessary to find some means of covering this article and preventing it from being used as a candy. I have found that a material such as paraffin could be used, where the coating was congealed on the surface, and that this is an ideal way of accomplishing the results desired. After experimenting with a number of products, I came to the conclusion that sulphur was probably the best of the materials which had been tried. There are a number of pitch and tar products which can be melted and serve for this purpose, as well as sulphur, provided a product is used whose melting point is high enough so that when the article is dipped in the molten mass, on removing it the coating is quickly congealed. There are a number of waxes and compositions of various characters which could be used equally as well as sulphur, their melting point being at a temperature which would not be excessive for the handling of the material in dipping. All of these materials, as well as sulphur, might have incorporated pigments or finely divided metallic particles in suspension, giving the coating a variety of different appearances. In the coating of molten material, I have incorporated charcoal, aluminum flake powder, red oxide of iron, and a variety of other materials, bronze powders, etc., all giving a different appearance to the coating, it being understood that these pigments or materials in suspension will not interfere with the fluid quality of the molten mass. It appears that a variety of materials such as pitch, tar, sulphur, etc., having a melting point between 80 and 150 degrees C. have no chemical action with the ingredients which go to make up the composition, and consequently do not inject an explosive hazard into the operation of dipping. Furthermore, when the article is so dipped a firm coating is spread over the surface, which is water-proof and which will protect the article from being dissolved in the saliva of the mouth, in the event a child should foolishly mistake it for candy. The coating is also hard enough so that there would be no invitation for a child to bite through it into the composition that it encases. This projecting coating fulfills a further office, namely, it protects the articles in shipping them from an explosive hazard, and makes them far more safe than they otherwise would be. This coating can be put on mechanically and is not offensive in its molten state to the operator. Either tar, pitch, sulphur, or other materials of a like nature with melting points within the range above given can be held in a molten condition without fuming or giving off offensive gases, and without making the operation of dipping hazardous or offensive.

The coating either by its appearance, taste, odor or by its hardness renders the article obnoxious to the appetite of the child.

These articles are also known under the name of "sun of a gun", "automatic torpedo" and "devil on the walk."

I claim:

1. A pyrotechnic article in the form of a small lozenge or the like having an adherent coating edibly obnoxious, substantially as described.

2. A pyrotechnic article in the form of a small lozenge or the like and containing yellow phosphorus, chlorate of potash and gum arabic, having an adherent coating obnoxious to the appetite, substantially as described.

3. A pyrotechnic article in the form of a small lozenge having a coating of sulphur to render said lozenge obnoxious to the mastication, substantially as described.

In testimony whereof I affix my signature.

HENRY B. FABER.